Mar. 20, 1923.
C. A. SWANSON.
GRASS CATCHER.
FILED JAN. 14, 1921.
1,448,880.
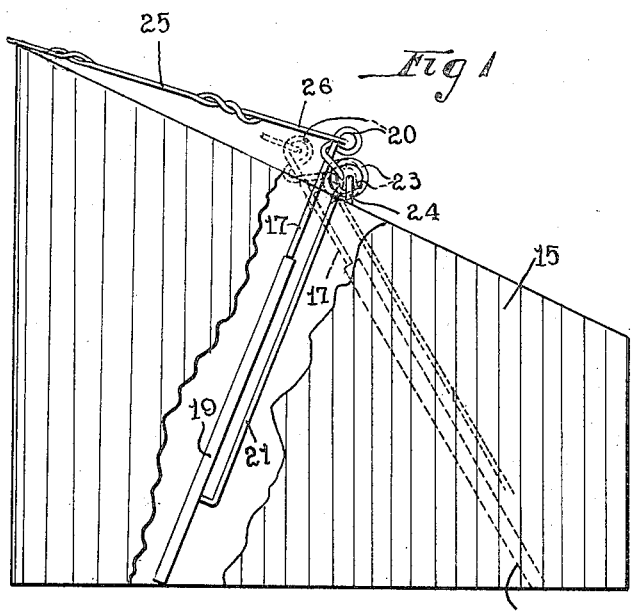
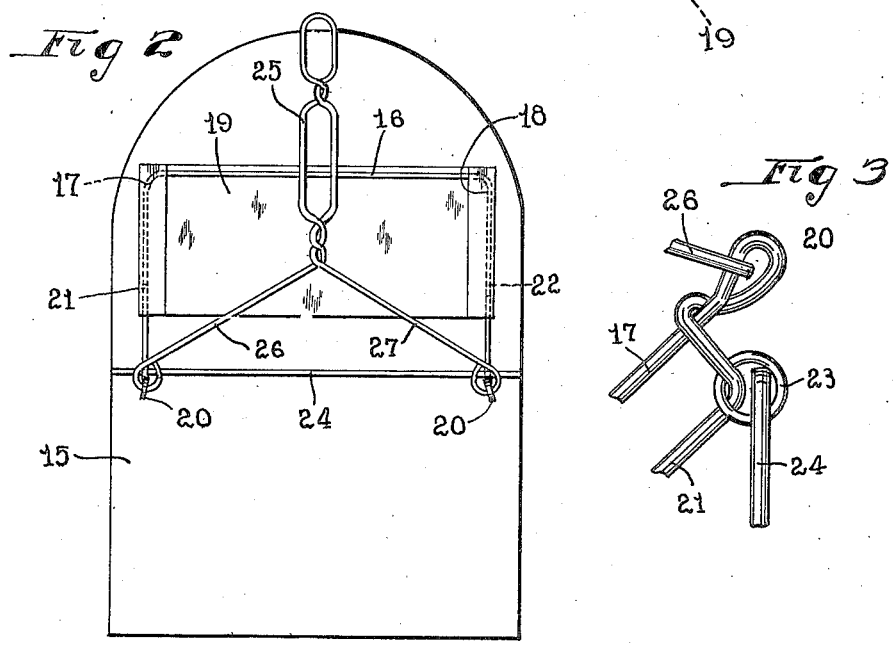
Witnesses
H. F. Moulton.
M. H. DuBusk
Inventor
Charles A. Swanson
By Joshua R. H. Hook
Attorney Patented Mar. 20, 1923.

1,448,880

UNITED STATES PATENT OFFICE.

CHARLES A. SWANSON, OF CHICAGO, ILLINOIS.

GRASS CATCHER.

Application filed January 14, 1921. Serial No. 437,263.

*To all whom it may concern:*

Be it known that I, CHARLES A. SWANSON, a citizen of the United States, and a resident of the city of Chicago, county of Cook, and State of Illinois, have invented certain new and useful Improvements in Grass Catchers, of which the following is a specification.

My invention relates to grass catchers and it has for its principal object the provision of a new and improved form of gate or sweeper by which the grass deposited in a grass catcher may be swept back and prevented from escaping therefrom, and whereby the grass catcher is adapted to be substantially completely filled.

Other objects will appear hereinafter.

The invention consists in the combinations and arrangements of parts hereinafter described and claimed.

The invention will be best understood by reference to the accompanying drawings forming a part of this specification, and in which, Fig. 1 is a side view of a grass catcher with my improved gate device applied thereto, the catcher being partially broken away for clearness of illustration, and the gate being shown in dotted lines in changed position.

Fig. 2 is a top plan view of the parts as shown in Fig. 1, and

Fig. 3 is an enlarged detailed view, showing the manner of connecting the gate to the grass catcher.

Referring to the drawings 15 indicates a grass catcher of any approved type adapted to be secured upon an ordinary lawn mower in rear of the rotary cutter, being mounted in position by the use of any appropriate means.

My improved gate or sweeper comprises in the construction shown a wire frame having a cross bar 16 and arms 17 and 18 extending at right angles thereto forming the sides of the frame. The body of the gate or sweeper is formed in the construction shown by a piece of fabric 19 mounted upon the frame work between the arms 17 and 18. As is best shown in Fig. 3, each of the arms 17 and 18 is bent at its upper end to form an eye 20, being thence extended downwardly in spaced relation to the side of the body of the gate opposite the arms 17 and 18, the bars in spaced relation being indicated in Fig. 2 by the numerals 21 and 22 respectively. The bars 21 and 22 are secured in any suitable manner at their lower ends to the gate or sweeper so as to be held firmly in position with respect thereto.

The gate is movably mounted in position with respect to the grass catcher by means of rings 23 which are slidably mounted upon the guide bars 21 and 22, so as to embrace also a cross support 24 of the grass catcher. By reason of this manner of mounting the gate or sweeper, it is free to move edgewise with respect to the bar 24 and is also adapted to swing about said bar as a pivot or fulcrum. For manipulating the gate or bar within the grass catcher about the bar 24, I have provided a handle 25 which is provided at its lower end with laterally extending arms 26 and 27 which are pivotally connected with the eyes 20 at the upper ends of the arms 17 and 18.

With the gate in the position shown in full lines in Fig. 1 within a grass catcher 15 mounted upon a lawn mower, as the machine is pushed along the ground a quantity of grass accumulates within the catcher or holder near its forward edge. If no means be provided for moving the grass backward in the catcher and for holding it from escape, the device is very soon filled to such an extent as to render its continued operation ineffective without first being emptied. In the use of my device, when a sufficient quantity of grass has accumulated in the forward portion of the holder, the operator, without leaving his position at the handle of the lawn mower, grasps the handle 25 and exerts thereby an upward pull upon the gate or sweeper serving to lift it into position to clear the grass at the forward edge of the holder. A backward pull upon the handle 25 then serves to swing the gate forwardly about the bar 24, after which the gate is permitted to slide diagonally forwardly and downwardly into the position shown in dotted lines in Fig. 1, in which position the lower edge of the gate or sweeper is in advance of the major portion of the grass which has accumulated in the holder. The gate is then swung about the bar 24 through the medium of a handle 25 for carrying the lower edge of the gate or sweeper backward along the bottom of the catcher again into the position shown in full lines in Fig. 1. In this position the grass which has been forced to the rear portion of the holder serves by a downward pressure upon the gate to hold the gate in position until the device is to be used for sweeping back a fresh accumulation of grass.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:—

1. A device of the class described, comprising a catcher; supporting means extending across said catcher; and a gate mounted on said supporting means, said gate having means permitting of swinging and bodily edgewise sliding thereof on said supporting means.

2. A device of the class described, comprising a catcher; a support mounted on said catcher; and a gate having guides engaging said support so as to permit swinging and edgewise sliding movement of said gate on said support.

3. A device of the class described, comprising a catcher; a support mounted on said catcher; a gate having guides engaging said support so as to permit swinging and edgewise sliding movement of said gate on said support; and means pivotally connected to the end of said gate for swinging and lifting said gate when operating same.

4. A device of the class described, comprising a catcher; a support mounted on said catcher; rings loosely mounted on said support; and a gate having guides engaging said rings so as to permit swinging and edgewise sliding movement of said gate on said support.

5. A device of the class described, comprising a catcher; a support mounted on said catcher; rings loosely mounted on said support; a gate having guides engaging said rings so as to permit swinging and edgewise sliding movement of said gate on said support; extensions on said guides; and means pivotally secured to said extensions for swinging and lifting said gate when operating same.

6. In combination, a gate device, bars secured along the sides thereof in spaced relation thereto, a support pivotally and slidably engaged by said bars, and a handle pivotally connected to said gate device at its upper edge portion.

7. In combination, a gate, comprising side bars in spaced relation to each other, and fabric secured between said side bars, a handle pivotally connected to the upper end portions of said side bars, and other bars secured on said gate in spaced relation thereto for supporting the gate slidably in position.

8. In combination, a gate, comprising side bars in spaced relation to each other, and fabric secured between said side bars, a handle pivotally connected to the upper end portions of said side bars, other bars secured on said gate in spaced relation thereto, and means slidably mounted on said last named bars for supporting the gate pivotally and slidably upon a grass catcher.

9. In combination, a gate, comprising side bars in spaced relation to each other, and fabric secured between said side bars, a handle pivotally connected to the upper end portions of said side bars, other bars secured on said gate in spaced relation thereto, and rings slidably mounted on said last named bars for supporting the gate pivotally and slidably upon a laterally extending portion of the grass catcher.

10. In combination, a gate, comprising side bars in spaced relation to each other, and fabric secured between said side bars, said bars being turned to provide oppositely disposed eyes and being thence extended as slide bars in spaced relation to the sides of the gate, a handle comprising oppositely extending arms at its lower end portion pivotally connected with said eyes, and means slidably mounted on said slide bars for supporting the gate pivotally and slidably upon the laterally extending bar of a grass catcher.

In testimony whereof I have signed my name to this specification in the presence of two subscribing witnesses.

CHARLES A. SWANSON.

Witnesses:
JOSHUA R. H. POTTS,
FREDA C. APPLETON.